(12) United States Patent
Pforr (10) Patent No.: US 9,235,431 B2
(45) Date of Patent: Jan. 12, 2016

(54) METHOD AND PROGRAM FOR INITIATING A SECOND SERVICE IN DEPENDENCY OF A FIRST SERVICE

(75) Inventor: Edgar Pforr, Koenigswinter (DE)

(73) Assignee: DEUTSCHE TELEKOM AG, Bonn (DE)

( * ) Notice: Subject to any disclaimer, the term of this patent is extended or adjusted under 35 U.S.C. 154(b) by 1057 days.

(21) Appl. No.: 13/379,371

(22) PCT Filed: Jun. 14, 2010

(86) PCT No.: PCT/EP2010/003539
§ 371 (c)(1),
(2), (4) Date: Dec. 20, 2011

(87) PCT Pub. No.: WO2010/149285
PCT Pub. Date: Dec. 29, 2010

(65) Prior Publication Data
US 2012/0110176 A1 May 3, 2012

Related U.S. Application Data

(60) Provisional application No. 61/219,577, filed on Jun. 23, 2009.

(30) Foreign Application Priority Data

Jun. 23, 2009 (EP) ..................................... 09008206

(51) Int. Cl.
*G06F 15/173* (2006.01)
*G06F 15/177* (2006.01)
*G06F 9/445* (2006.01)
*G06F 9/48* (2006.01)
*H04L 29/06* (2006.01)
*H04L 29/08* (2006.01)

(52) U.S. Cl.
CPC .......... *G06F 9/44505* (2013.01); *G06F 9/4843* (2013.01); *H04L 65/1069* (2013.01); *H04L 67/26* (2013.01); *Y02B 60/144* (2013.01); *Y02B 60/185* (2013.01)

(58) Field of Classification Search
CPC .. H04L 65/1066; H04L 65/1069; H04L 67/26
USPC .......................................... 709/224, 222, 225
See application file for complete search history.

(56) References Cited

U.S. PATENT DOCUMENTS

| 5,671,366 A | 9/1997 | Niwa et al. |
| 2004/0242224 A1 | 12/2004 | Janik et al. |
| 2004/0261079 A1 | 12/2004 | Sen |

FOREIGN PATENT DOCUMENTS

| CN | 1945535 A | 4/2007 |
| EP | 1452964 a1 | 9/2004 |
| EP | 1760584 A1 | 3/2007 |
| JP | 2000092198 A | 3/2000 |
| JP | 2008131080 A | 6/2008 |
| WO | 2004084413 A2 | 9/2004 |

OTHER PUBLICATIONS

European Patent Office, International Search Report in International Patent Application No. PCT/EP2010/003539 (Aug. 31, 2010).

*Primary Examiner* — Daniel C Murray
*Assistant Examiner* — Adam Cooney
(74) *Attorney, Agent, or Firm* — Leydig, Voit & Mayer, Ltd.

(57) ABSTRACT

A method for initiating a second service in dependency of a first service using individually configured event-driven state-machines includes executing the first service in a first communication space; transmitting a first event to an operator unit in dependency of the first service; triggering a first event-driven state-machine of the operator unit by the first event; generating a second event by the first event-driven state-machine; transmitting the second event to at least one of the first communication space and a second communication space; and initiating the second service in the at least one of the first communication space and the second communication space by the second event.

17 Claims, 4 Drawing Sheets

METHOD AND PROGRAM FOR INITIATING A SECOND SERVICE IN DEPENDENCY OF A FIRST SERVICE

CROSS-REFERENCE TO RELATED APPLICATIONS

This patent application is a national stage entry under 35 U.S.C. §371 of International Application No. PCT/EP2010/003539, filed Jun. 14, 2010, claims priority to European Patent Application No. EP09008206.6, filed Jun. 23, 2009, and U.S. Provisional Patent Application No. 61/219,577, filed Jun. 23, 2009. The International Application was published in English on Dec. 29, 2010 as WO 2010/149285.

FIELD

The present invention relates to the field of providing and executing certain services in communication spaces.

BACKGROUND

There are a large number of different communications spaces, e.g. telephone networks, thousands of intranets, heating systems, a car, an intelligent house, millions of private computers, a model railroad, a computer game, a net game, billions of television receivers, audio and video players, media servers and mobile devices, a virtual reality, the office suites on personal computers, a robot, the control room of a plant, a user browsing a Web page, a cruise liner, a further telephone network, an airport, a satellite, a supermarket and so on. Common to all of them is, that specific information are exchanged and that within each communication space the information transfer methods are optimized according certain, in the main communication space specific criteria. Due to the fact that those optimization criteria differ obviously as the case arises, each communication space is good at internal information transfer, but ill-suited when one thinks of external communication options.

Furthermore, it is well known that there are examples where two communication spaces can communicate among themselves (apart from Internet connections or similar), but those communications are well-regulated by using well-defined interfaces with well-defined, barely extendable protocols. So e.g. a network of a mobile telephone operator is connected with networks of other operators in this vein. But these interfaces are laid out for very specific purposes in almost all cases. There is currently no universal and flexible method in order permit two (or more) arbitrary communication spaces to bring (supplementary) inter-workings about.

SUMMARY

In an embodiment, the present invention provides a method for initiating a second service in dependency of a first service using individually configured event-driven state-machines, the method comprising: executing the first service in a first communication space; transmitting a first event to an operator unit in dependency of the first service; triggering a first event-driven state-machine of the operator unit by the first event; generating a second event by the first event-driven state-machine; transmitting the second event to at least one of the first communication space and a second communication space; and initiating the second service in the at least one of the first communication space and the second communication space by the second event. The first event-driven state-machine is pushed from an internet server to the operator unit by a second event-driven state-machine. The first event-driven state-machine is individually configurable by a user for initiating the second event in dependency of the first event.

DETAILED DESCRIPTION

In an embodiment, the present invention provides individually configurable interactions between multiple services which, in a further embodiment, covers multiple communication spaces in parallel and enables the implementation of customized and user-configured services that does not have the drawbacks of the prior art.

In the embodiment, a method is provided for initiating a second service in dependency of a first service using individually configured event-driven state-machines comprising the steps of executing a first service in a first communication space, transmitting a first event to an operator unit in dependency of the first service, triggering a first event-driven state-machine of the operator unit by the first event, generating a second event by the first event-driven state-machine, transmitting the second event to the first communication space and/or to a second communication space and initiating a second service in the first and/or in the second communication space by the second event, wherein the first event-driven state-machine is pushed from an internet server to the operator unit by a second event-driven state-machine and wherein at least the first event-driven state-machine is individually configured by a user for initiating the second event in dependency of the first event.

The second service is initiated by the first event-driven state-machine which is indirectly triggered by the first service. Therefore, the interaction between the first and the second service is defined by the functionality of the first event-driven state-machine of the operator unit. Advantageously, the first event-driven state-machine is at least partly individually configurable by the user, so that the above mentioned interaction between the first and the second services can be adapted to personal requirements of the user. Beneficially, arbitrary functionalities between different services are feasible and freely programmable by the user. In an embodiment, both the first and the second event-driven state-machine are individually configured by the user. Advantageously, the user has the possibility to configure and modify the first event-driven state-machine on the internet server independently from the operator unit, as the first event-driven state-machine is uploaded to the operator not until the first event-driven state-machine is requested by the operator unit with a corresponding initial event, as this corresponding initial event causes the second event-driven state-machine to push the individually configured first event-driven state-machine to the operator unit. Therefore, the user does not need to configure the operator unit directly. In an embodiment, the operator unit is controlled by a communication space operator or authority, like a mobile phone provider, which has to activate the transmission of first and/or second events between the first communication space and the internet server.

For example, the connection between a mobile network as the first communication space and an internet server for initially triggering the second event-driven state-machine in such a manner, that the second event-driven state-machine pushes the customer defined first event-driven state-event machine to the operator unit of the mobile network provider has to be activated by the mobile network provider. If the mobile network provider trusts the assigned customer ID, the connection between the mobile network and the second event-driven state machine of the user is initiated via the operator unit, so that the second event-driven state-machine detects an initial event and pushes the first event-driven state-machine towards the operator unit. Subsequently, the operator unit is capable of executing the commands of the first event-driven state-machine and the user is able to use his individually configured functionalities.

In an embodiment, the functionality and the source code of the event-driven state-machines are checked by the mobile provider before storing and activating the second event-driven state-machine on the internet server. Therefore, the mobile provider makes sure, that the syntax of the first event-driven state-machine is correct, when the first event-driven state-machine is pushed towards the operator unit.

The second service is executed in the first and/or in the second communication space. Thus, a connection between at least two fully different communication spaces could be provided by the method in an embodiment according to the present invention where a first event or a first service in the first communications space initiates an arbitrary second event or a second service in the second communication space, for instance. In an embodiment, the initial event is forwarded to the second event-driven state-machine by a first application of the operator unit, wherein the first application incorporates at least partially the functionality and in particular even the source code of the first event-driven state-machine after the first event-driven state-machine has been uploaded to the operator unit by the second event-driven state-machine triggered by the initial event. Subsequently, a first communication between the first communication space and the operator unit is controlled by the first event-driven state-machine which is pushed towards the operator unit and a second communication between the internet server and the internet is controlled by the second event-driven state-machine on the internet server, for instance. In particular, the first and the second event-driven state-machine communicate with each other directly via a TCP/IP based interface. Advantageously, the functionality of the first event-driven state-machine can be adapted to arbitrary communication space. Together with the individually configurable second event-driven state-machine the customer is able to configure arbitrary functionalities between any different communication spaces. The second service could be a new service which is independent of the second service. Alternatively, the second service could be a certain continuation of the first service in the first communication space.

In an embodiment, the second communication space is linked to the internet server via a further operator unit comprising a further first event-driven state-machine, wherein, in a further embodiment, the further event-driven state-machine is pushed to the further operator unit by the second event-driven state-machine. It is a great advantage that every communication path between the internet server and a certain communication space is individually controlled by exactly one certain event-driven state-machine. In an embodiment, the first event-driven state-machine is allocated to the first communication space and the further first event-driven state-machine is allocated to the second communication space. In an embodiment, the operator unit covers a service provider for the first communication space, wherein the further operator unit covers a further service provider for the second communication space. In an embodiment, the modular principle is used, so that the number of incorporated communication spaces and/or user-defined web applications (and users respectively) can easily be extended by incorporating further first event-driven state-machines and/or further communication spaces. Thereby, any communication space comprising an internet connection for web-based interaction with the internet server can be used modularly as first, further first and/or second communication spaces.

In an embodiment, the first communications space is a telephone network (particularly a mobile network). Communication spaces include telephone networks, thousands of intranets, heating systems, a car, an intelligent house, millions of private computers, a model railroad, a computer game, a net game, billions of television receivers, audio and video players, media servers and mobile devices, a virtual reality, the office suites on personal computers, a robot, the control room of a plant, a user browsing a Web page, a cruise liner, a further telephone network, an airport, a satellite, a supermarket and so on, for instance. A first or second service comprises every active or passive event in the corresponding communication space. For example, a service could be a telephone call, a computer command, a power switch adjustment, a SOS-signal, a certain global positioning signal and so on. Furthermore, a service could be a combination of such events in one or in multiple communication spaces. For example, during configuration of the first event, the user addresses the first and the second service or alternatively the first and the second event. In an embodiment, the internet server comprises further event-driven state-machines. In a further embodiment, each event-driven state-machine corresponds to every communication space. In particular, the internet server comprises per user at least one event-driven state-machine for at least each communication space. If the internet server also comprises a setup event-driven state-machine, the internet server features an amount of (n+1)-event-driven state machines per user, wherein the number n represents the total number of communication spaces that can be addressed by for the certain user. Advantageously, the implementation and configuration of such event-driven state-machines is comparatively simple and requires little computing power.

In an embodiment, the first communication space is linked to the operator unit via a mediator unit, which transforms a data type of the first communication space into a data type applicable for the first event-driven state-machine and which transforms a data type of the first event-driven state-machine into a data type applicable for the first communication space. Advantageously, the usage of such mediators provides a compatible and, in an embodiment, bidirectional communication between a (further) first state-event machine and the corresponding communication space. As a result, the method according to the embodiment can be operated with any arbitrary communication space.

In an embodiment, the internet server transmits further events via internet connection to further internet servers, wherein, in a further embodiment, the further events triggers further event-driven state-machines individually configured by further users. In an embodiment, the further web applications initiate further services in the internet, in the first communication space, in the second communication space and/or in further communication spaces. For instance, a further web event of the event-driven state-machine is transmitted to a third communication space via a further internet server, wherein the further internet server comprises a user-configurable further first event-driven state-machine for triggering and/or detecting further services in the third communication space. Advantageously, a large amount of different internet servers represents a parallel and therefore a comparatively fast working network according to a neural network. In an embodiment, this network comprises a large number of first and second event-driven state-machines, whereas every first and second event-driven state machine is allocated to just one certain user and, in an embodiment, individually configured by this user. These different second web applications become interlinked, if the corresponding users configure their event-driven state-machines for corporate interaction with each other.

In an embodiment, the first, the second, the further first and/or the setup event-driven state-machines are provided by a web page on the internet server featuring a well-defined Uniform Resource Identifier, wherein a certain web page is allocated to a certain user and/or to a certain group of users and wherein a certain user is allocated a well-defined ID in the corresponding communication space. A "user" could be a software program, a single person, like a consumer or a programmer, as well as an organization, like a company or an association or the like. Every user can be identified in a certain communication space by a certain user ID, for instance. Particularly, the first, the second and the setup event-driven state-machines are provided by a certain web page on the internet server for each case. In an embodiment, this web page contains the source code of the first, the second and the setup event-driven state-machine, wherein the web page features a well-defined Uniform Resource Identifier. The Uniform Resource Identifier is related to the certain user ID. The web page is also referred to as communication page.

In an embodiment, the first, the second, the further first and/or the setup event-driven state-machine is configured by uploading a certain algorithm to the internet server, by online modification of the algorithm on the internet server and/or by clearing a certain algorithm by a provider. In an embodiment, the first, the second, the further first and/or the setup event-driven state-machine are configured by the user with the aid of a graphical user interface and particularly the graphical user interface comprises certain templates and/or a compiler which transforms graphical inputs from the user into an applicable computer language for the second application. Thus, an ordinary consumer is able to configure the certain event-driven state-machine for personal applications and individual tasks in a self-explanatory and self-evident manner. Beneficially, a comprehensive knowledge of programming and source-code edition is not necessary. In an embodiment, the algorithm comprises the source code of the web page (communication page).

In another embodiment of the present invention, program is provided for initiating a second service in dependency of a first service using individually configured event-driven state-machines, wherein the program comprises at least a first and a second event-driven state-machine stored on an internet server, wherein the second event-driven state-machine pushes the first event-driven state-machine at least partially from the internet server to an operator unit, if the second event-driven state-machine detects an initial event from a first communication space, wherein the first event-driven state-machine which is pushed towards the operator unit controls a first communication between the operator unit and the first communication space. The program for initiating a second service in dependency of a first service corresponds to the method, as described above. Therefore, this program beneficially provides individually configurable software which is capable of partially installing itself on the operator unit, so that the user is capable of programming personalized functionalities and interactions between the first and the second services without configuring the operator unit directly. Furthermore, the computer program provides a platform for programming arbitrary and individually configurable interactions between different communication spaces.

In another embodiment of the present invention, a computer program product and/or a computer network is provided that comprises a program for initiating a second service in dependency of a first service as mentioned above.

These and other characteristics, features and advantages of the present invention will become apparent from the following detailed description, taken in conjunction with the accompanying drawing, which illustrate, by way of example, the principles of various exemplary embodiments of the invention. The description is given for the sake of example only, without limiting the scope of the invention. The reference figures quoted below refer to the attached drawing.

The present invention will be described with respect to particular exemplary embodiments and with reference to a certain drawing but the invention is not limited thereto. The invention is limited only by the claims. The drawings are merely exemplary and are non-limiting. In the drawing, the size of some of the elements may be exaggerated and not drawn to scale for illustrative purposes.

Figure 1:
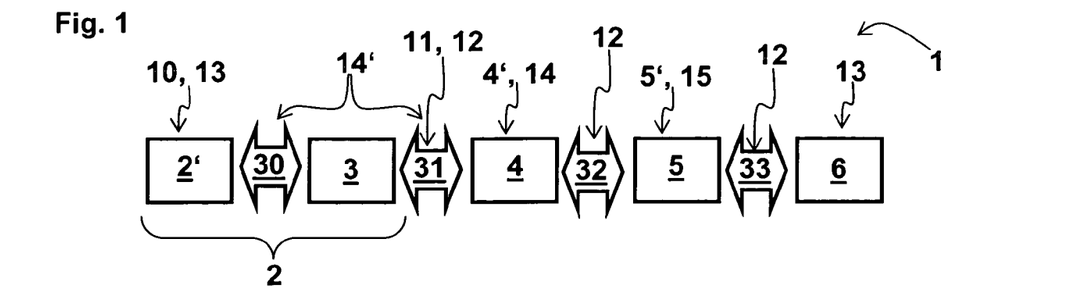
FIG. 1 illustrates a flowchart of a method for initiating a second service in dependency of a first service according to a first exemplary embodiment of the present invention.

FIG. 1 shows a flowchart 1 of a method for initiating a second service in dependency of a first service according to a first exemplary embodiment of the present invention. The flowchart 1 comprises a first communication space 2, a mediator unit 3, an operator unit 4, an internet server 5 and a second communication space 6. The first communication space 2 features a core network 2' of a mobile communications network, wherein the second communication space 6 covers the World Wide Web 6.

A first service 10 in the first communication space 2 is transmitted to the mediator unit 3 with an operator interface 30. The operator interface 30 serves for the core network control purposes. The mediator unit 3 belongs to the first communication space 2 and translates commands and data in the command language of the core network 2' into commands and data applicable for the operator unit 4 and vice versa. The operator unit 4 comprises a first application 4' which handles first events 11 from the mediator unit 3. Furthermore, the first application 4' communicates with a second event-driven state-machine 15 on the internet server 5 via an Operator-server-interface 32, preferably a TCP/IP based interface. The internet server 5 is connected to a second communication space 6 and capable of initiating second services 13 in the second communication space 6, like transferring data with further internet servers, modifying web based data bases or the like. This interface is called Internet-interface 33. In an optional embodiment of the present invention a further operator unit is provided between the internet server 5 and the second communication space 6. This further operator unit can be included (e.g. as an application programming interface API) into the second event-driven state machine 15 on the internet server 5, for instance.

The second event-driven state-machine 15 is individually configurable by a certain user. An admission for the internet server 5, as well as the connection between the internet server 5 and the operator unit 4 has to be activated for the certain user by the mobile provider. Afterwards, the user can upload an individual configured web page to the internet server 5 comprising a first event-driven state-machine 14, the second event-driven state-machine 15 and a setup event-driven state-machine 16. In an embodiment, the syntax of the web page is checked by the mobile provider during uploading to the internet server 5, so that the second web page is only accepted and activated when the first, the second and the setup event-driven state-machines 14, 15, 16 are error-free. The web page is also referred to as communication page 5' (ComPg), which is stored on the internet server 5 available via a well-defined URI. The first event-driven state-machine 14 is called "ComPg_Tel" and is designed to handle a first communication 14' between the core network 2' and the second event-driven state-machine 15, wherein the second event-driven state-machine 15 is called "ComPg_Web" and is designed to handle a second communication 15' between the first event-driven state-machine 14 and the World Wide Web 6. The setup event-driven state-machine 16 includes personal information about the user. If an initial first service 10' in the core network 2' is assigned to the certain user, the operator unit 4 sends a corresponding initial event 11 called "INITIAL" to the internet server 5. The event "INITIAL" triggers the second event-driven state-machine 15 "ComPg_Web" in such a manner, that the first event-driven state-machine 14 "ComPg_Tel" is pushed towards the operator unit 4. Subsequently, the operator unit 4 is capable of operating first services in accordance with the user-configured first event-driven state-machine 14 "ComPg_Tel". Particularly, the processing of the first events 11 by the operator unit 4 is determined by the first event-driven state-machine 14. The internet server 5 operates furthermore in accordance with the second event-driven state-machine 15 "ComPg_Web", wherein the second event-driven state-machine 15 defines the processing of events from the first event-driven state-machine 14 via the Operator-server-interface 32, as well as second services 13 in the World Wide Web 6.

The proposed method in an embodiment enables telephony users to manage their communications by means of processing commandments deposited within the Web. Those processing commandments may lie alongside of other user Web contents (e.g. Web pages or arbitrary user files) and have to be hosted by an Internet service provider (ISP) 5 correlated with the user's telephony operator unit 4 in such a way that a particular bipartisan mutual trust exists. Due to the facts that such commandments govern arbitrary user communications in consideration of her telephony behavior and that the commandments are located within the Web 6, they are called communication pages 5'.

There is at most one communication page 5' per public user identification assigned to the user as e.g. a telephone number. Those pages are called direct communication pages (Direct ComPg). A direct communication page can be addressed by means of an URI derivable from the served user's identity (e.g., via an address such as http://www.ComPg.T-Mobile.org/ComPg/+49-171-6289xxx/CnmPg.bxt). It is further possible to combine multiple public identities on one dedicated communication page (Indirect communication pages, Indirect ComPg) by referencing the related URI from the direct communication pages assigned to the IDs involved. There is in principal no restriction with respect to the amount of direct communication pages referring to an indirect communication page. It is further possible that indirect communication pages refer to another indirect communication page. A communication page 5' may be of a direct and an indirect nature at the same time.

Communication pages 5' are built at least partly by the user. This could be done by completing prefabricated provisional communication pages 5' (simply by assigning values to variables, e.g. the own telephone number), by using a user friendly tool (comparable with the popular tools to compile an "ordinary" web page) or by instantaneous editing of the page content. Communication pages 5' have to be uploaded to the ISP server 5 subsequently. The Internet Service Provider 5 should not accept an erroneous communication page 5' or a communication page 5' which is going to address (telephony) capabilities not granted for the page owner. The technical system under control of those pages presupposes that all communication pages 5' available on a server of trusted ISP 5 are free from defects and are in line with the possibilities permitted to the served user.

The content of communication pages 5' can be seen as a description of a rather simple event-driven state-machine 14, 15, 16. Any external event may trigger an action or a concatenation of actions and may cause a state change in addition. Dependent on the state entered, one and the same event might be treated differently. Actions can be shaped for arbitrary purposes, e.g. in order to generate another event (e.g., to instruct a telephony system for certain activities), to call a piece of software running at the Internet Service Provider side or located anywhere within the Internet or on the user's PC (as e.g. generating an E-Mail to a certain addressee (or multiple addressees) providing a certain content) or to set or modify one or multiple communication pages variables. In addition an action could interrogate variable values and could combine terms by arbitrary logical operations in order to come to a decision.

Beside the provisioning of variables with values provided along with events, others variables might be accommodated with static values well-declared within the communication page 5' (e.g. public telephone numbers, URI's of E-Mail accounts, of utilizable software or of any other Web content, passwords or entire data structures (as e.g. a list of all contacts maintained by the user)). A next type of variables in turn will be filled on per transaction basis, as e.g. the actual date and time as well the identity of the current communication partner.

Aside from the declarations (also referred to as setup event-driven state-machine 16, see above), communication pages 5' include at least first and second event-driven state-machines 14, 15 generally: In the present example, the first event-driven state-machine 14 is relevant for serving telephony system (e.g. the mobile network 2') and the second event-driven state-machine 15 "ComPg_Web" cares about Web interactions Whereas the Web part got the responsibility for supervision and processing of events originated from the surrounding Internet, the telephony part is downloaded to the application layer of the serving telephone network operator unit 4 (when necessary) and controls there the entire telephone communications of the user meant.

A communication page 5' once accepted by the Internet Service Provider 5 causes two things in principle:

First the Internet Service Provider starts dedicated software which forms a Web related, user specific second application 5' by interpreting the second event-driven state-machine 15 "ComPg_Web" of the communication page 5' (Initiating machine state is W_NULL). The second event-driven state-machine 15 is responsive to "Web events" which are events either from anywhere out the Web space or from the serving telephone network. A Web event is just attended by the machine when specified on the second event-driven state-machine 15 of the communication page 5' (operator or user defined). If so, one or multiple actions are executed and even one (or multiple) outgoing events might be generated due to this.

Each user is permitted to define as many Web events (and corresponding actions) as necessary for her purposes. Beyond it is up to the event-driven state-machine 14, 15 how an external contact attempt (first event 11) (from outside) is mapped to a second event 12 and whether/which/how parameters are passed thereby. There are many fitting approaches to do so. The given document assumes a specific Web application programming interface (API) whereby each Web event (as far as defined for a communication page 5') got a unique (tag-) value (WebEvent=<name>) to be used whenever a certain event (<name>) shall be addressed via the Web application programming interface.

There are two (operator) pre-defined Web events (those which are added automatically to the communication page 5' right before storing the page and which cannot be manipulated by the user: a web event which is called "TELEPHONE"-event and a web event which is called "ONHOOK"-event, for instance.

The web-event "TELEPHONE" (WebEvent=TELEPHONE) is addressed by the telephone network (first communication space 2) whenever a request for a telephone transaction has been encountered for the served user. Moreover this event is linked constantly with following actions:

Action1: Check whether the maximum number of allowed parallel transactions ('MAXNumberOfParallelTransactions') is already reached. If so, refuse the request. Continue with next action otherwise. Action2: Assign a unique number to the new transaction. Action3: Update the structure 'CURRENTTransactions'. This structure maintains a transaction nature per transaction currently processed for a certain user (e.g. SOC (subscriber originated call), STC (subscriber terminated call. WIC (Web initiated call), MSO (message originated), MST (message terminated), SOU (subscriber originated USSD dialogue), WOU (Web originated USSD dialogue), etc.).The structure lists transactions in the order of their invocations. So the last listed transaction is the one the telephone network is actually asking for. Action4: Push the first event-driven state-machine 14 "ComPg_Tel" of the communication page 5' towards the telephone network (This includes the provisioning of the actual structure 'CURRENTTransactions'.).

The web event "ONHOOK" (WebEvent=ONHOOK) is addressed by the telephone network (first communication space 2) whenever a telephone transaction has been completed. Also this event is linked constantly with an action: Update the structure 'CURRENTTransactions' by withdrawal the line related to the transaction terminated.

Second as soon as the first event-driven state-machine 14 "ComPg_Tel" of the communication page 5' has been obtained from the internet server 5, the network of the serving telephone operator 4 (also called operator unit 4) takes care about the telephony processing commandments made by the user. For this purpose a dedicated application is running within the operator domain. This application might act as a classic IN service on top of a circuit switched based telephone network 2' or even as a next generation network (NGN) application server. Common to both is the ability to control in principle arbitrary telephony transactions. The amount of control options available for such an application depends primarily on relating methods implemented within the subjacent and operator specific telephone network.

The first event-driven state-machine 14 of the communication page 5' forms partly a telephony related event-driven state-machine of the first application and is responsive to telephony events 11 (TELEvents) which are events either from the telephone network 2' under control or from the serving Internet Service Provider (Initiating machine state is T_NULL). At the beginning the application has the ability to process a reduced set of (operator) pre-defined TELEvents 11 only. Not until the first event-driven state-machine 14 of the communication page 5' has been received, the processing capabilities of the application are expanded by user specific TELEvents 11 and relating actions.

A TELEvent 11 is just attended by the first application when either pre-defined or specified by the user in the first event-driven state-machine 14 "ComPg_Tel". If so, one or multiple actions are executed and even one (or multiple) outgoing events 12 might be generated due to this. Outgoing events 12 which are directed towards the telephone network are translated to core network 2' instructions appropriate to the operator capabilities and methods implemented with respect to the control interface.

As far as events from the serving Internet Service Provider are concerned, each user is permitted to define as many TELEvents 11 (and corresponding actions) as necessary for her purposes. Beyond it is up to the state-event machine how a contact attempt from the Internet Service Provider 5 is mapped to a TELEvent 11 of the ComPg_Tel 14 and whether/which/how parameters are passed thereby. Each TELEvent 11 (as far as defined for a communication page) got a unique (tag-) value (e.g. TELEvent=<name>) to be used whenever a certain event shall be addressed from either direction.

There are a number of (operator) pre-defined TELEvents (those which are either known implicitly by the telephone operator application (first application 4') or which are added automatically to the communication page 5' right before storing the page; pre-defined TELEvents cannot be manipulated by the user; nevertheless it might be necessary that the user has to define one (or multiple) actions for certain pre-defined events).

In an embodiment, one pre-defined TELEvent exists for the direction from the Internet Service Provider 5. From the telephone network 2' two of those TELEvents are envisaged.

The first TELEvent: PUSHComPg is addressed by the Internet Service Provider 5 whenever the second event-driven state-machine 15 has been requested to push the first event-driven state-machine 14 of the communication part 5' (and additional information as e.g. the structure CURRENTTransactions) towards the telephone network 2' to the operator unit 4. The activator for this request could reside anywhere within the Internet 6 or could be even the telephone network 2' itself. A user action should be defined mandatory for the given event so that following actions are performed:

Action 1: Store the first event-driven state-machine 14 ComPg_TEL of the communication page 5' as well as all provided additional information (The ComPg_Tel enhances the first application 4' of the operator unit 4 for the duration of the upcoming transaction with user events and actions.). Action 2: Execution of user action(s): All details for the desired transaction should have been determined by the user within ComPg_Tel 14. These details are converted by the application to operator specific core network (CN) instructions, dependent on the general CN control interface available. The following options exist roughly for the user: a) INITIATETransaction: Initiate a transaction in order to cause the system to initiate a call or an USSD (Unstructured Supplementary Service Data) dialogue. b) CONTINUETransaction: Continue a transaction in order to cause the system to develop an existing transaction (call, message or USSD dialogue) anyhow further (e.g. to setup a call to a certain (or multiple)

destinations or to answer an USSD request from a mobile subscriber). c) RELEASETransaction: Release a transaction in order to eliminate a call party from a transaction or to end the entire transaction respectively. d) PROMPTTransaction: Prompt a transaction in order to prompt a call party for some input. For all these options the user could name additionally transaction progress types to be supervised by the telephone network 2 (compare to TelEvent=REPORT further down). The options have to be seen in connection with the nature of the actually given transaction. Moreover there is a good deal of involved control variable as e.g. destination numbers, the number to be presented at destination or identities of transaction legs meant. Finally it is up to the telephone operator to publish the exact syntax on all possibilities granted in this context. The present document just intends to give an approximate idea on those user capabilities. Action 3: Change state from the initiating machine state (T_NULL) to the machine state "started" (T_STARTED).

The first state-event machine 14 (embedded in the first web application 4') is even enabled to generate parallel TELEvents. Each of these TELEvents causes a separate telephone application instance working independently from other instances created. Based on this there is e.g. the possibility to initiate multiple calls sharing the same conference room (located anywhere, but reachable for the telephone operator unit 4).

The second TelEvent INITIAL is addressed by the telephone network 2' whenever a request for a telephone transaction has been encountered for the served user. Moreover this event is linked constantly with following action: Send the Web event 12 WebEvent=TELEPHONE to the second event-driven state-machine 15 on the internet server 5. This event includes information about the nature of transaction encountered (e.g. a call or message from/to a served user or a subscriber originated USSD dialogue). After this the application is awaiting the TELEvent TelEvent=PUSHComPg from the ISP.

A third TelEvent REPORT is addressed by the telephone network 2' whenever a progress has been recognized for the maintained transaction. Such a progress could be of arbitrary nature, as e.g. transaction setup failure or success, trigger in the middle (of transaction), transaction released (any party) or the arrival of some input from a party involved. The progress types to be attended for a transaction result from a combination of types to be supervised by default (operator specific) with types to be armed with respect to the user's first event-driven state-machine 14 (ComPg_Tel) received by means of the first TELEvent PUSHComPg. Default progress types are (e.g.) 'transaction setup failure' and 'transaction released'. This event might or might not be linked with a user action as follows (only the progress type examples named right before are taken into account; there could be types in addition) (line numbers in brackets):

```
CASE (PROGRESSType) (1)
  OF FAILURE: (2)
      IF (USERAction for PROGRESSType defined?) (3)
      THEN (4)
          Execution of user action(s); (5)
      ELSE (6)
          Send WebEvent=ONHOOK; (7)
          Instruct the telephone network to continue (8)
          (transaction release); (9)
          Change state (from 'T_STARTED') to 'T_NULL'; (10)
      FI (11)
  OF SUCCESS: (12)
      Execution of user action(s) for PROGRESSType; (13)
```

-continued

```
  OF MIDDLE: (14)
      Execution of user action(s) for PROGRESSType; (15)
  OF RELEASED: (16)
      IF (USERAction for PROGRESSType defined ?) (17)
      THEN (18)
          Execution of user action(s); (19)
      ELSE (20)
          Send WebEvent=ONHOOK; (21)
          Instruct the telephone network to continue (22)
          (transaction release); (23)
          Change state (from 'T_STARTED') to 'T_NULL; (24)
      FI (25)
  OF INPUT: (26)
      Execution of user action(s) for PROGRESSType; (27)
CASE END (28)
```

The event types 'SUCCESS', 'MIDDLE' and 'INPUT' will be armed only, when corresponding user action(s) are defined within the first event-driven state machine 14 (ComPg_Tel).

Other important events: The event type 'INITIATE' is sent out in order to cause the core network 2' to initiate a call or an USSD dialogue. The event type 'CONTINUE' is sent out in order to cause the core network 2' to develop the maintained transaction (call, message or USSD dialogue) anyhow further (e.g. to setup a call to a certain (modified or multiple) destinations or to answer an USSD request from a mobile subscriber). It is even possible to trigger the core network 2' for a transaction continuation without modifying any transaction parameter (classic continue). Furthermore, the event type 'RELEASE' is used to eliminate a call party from a transaction or to end the entire transaction respectively. The event 'PROMPT' is sent out in order to cause the core network to prompt a call party for some input and/or to play an announcement(s).

The entire mechanism enables to realize amazing, so far unknown features around a real telephone network 2'. The possibilities offered go far beyond of a rather unspectacular Internet controlled telephony net. In fact it has it in oneself to add really new services to the today's and future telephony world. More, the present technology allows combining telephone networks 2' and Internet 6—right now (saving invests) and future-proof (without impacts on (perhaps) already compiled migration strategies towards a NG network architecture). Telephone technologies and the method according to the present invention coalesce.

Furthermore, services go individual. As soon as a user is permitted to see for her web application respectively her Communication Page 5', she is able to create her own and personalized services. It is further possible to merge users with joint interests to constitute communities and to define communication rules appropriate to their needs. Because Communication Pages 5' form another user content, the involved operating companies will take care to protect those pages against unauthorized access attempts.

Telephone operator unit 4 and ISP 5 are enabled to utilize the mechanism to implement new services for the mass-market. An operator/ISP 4, 5 capable of processing the method described above will have an edge over competitors which fail to do so. Furthermore, the mechanism described above offers another technical method for quite a number of known services.

These days it is rather uninspiring when a telephone network service 11 obtains its data from the Internet 6 and acts according these data. The same is true for Web services 13. But an exciting innovation is an Internet content covering both, where a network of a real telephone operator unit 2 and the Web 6 are enabled to control them in parallel, concerted by events and shaped according individual needs. Using embodiments of the present invention, it is no longer solely up to a telephone operator how her users are served. In fact each single user will be permitted to adjust his personal service to a great extent. Furthermore, he need not to purchase a telephone network 2' for this purpose, because it becomes possible as soon as her operator is compliant with the above mentioned technology.

Figure 2:
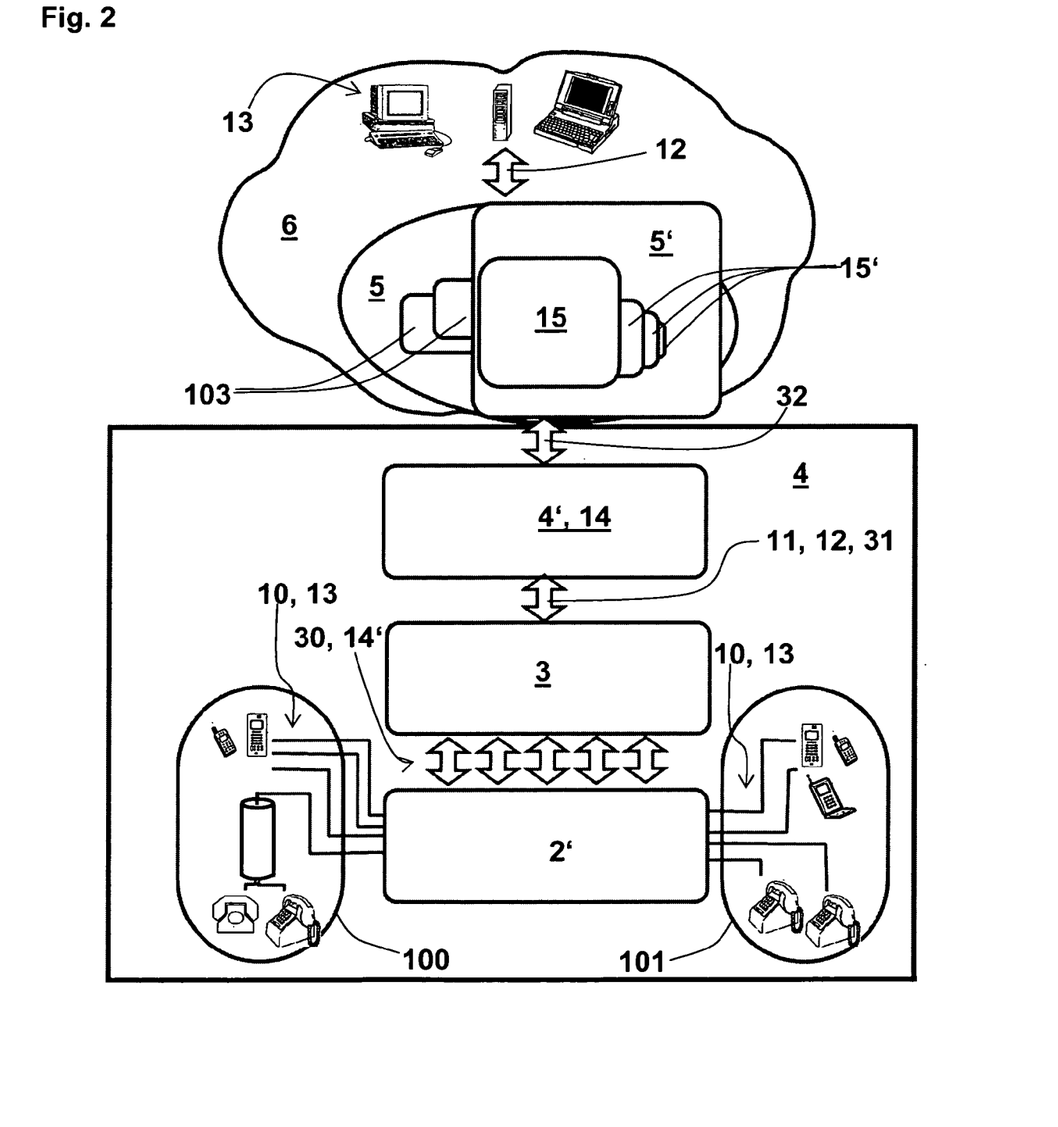
FIG. 2 illustrates a flowchart of a method for initiating a second service in dependency of a first service according to a second exemplary embodiment of the present invention.

FIG. 2 shows a flow chart of a method 1 for initiating a second service in dependency of a first service according to a second exemplary embodiment of the present invention. The first web application 4' and the communication pages 5', 103 of different users are hosted by a telephone operator unit certified Internet Service Provider 5. As soon as a certain Communication Page 5' is uploaded to an ISP server 5, a related second event-driven state-machine 15 ComPg_Web of the Communication page 5' (re-) starts at ISP 5 side. In general, the internet server 5 comprises multiple communication pages 5', 103, wherein exact one communication page 5', 103 is allocated to a certain user. One of these communication pages 5', 103 is activated by the operator unit 4. This communication page 5' comprises multiple state-event machines 15, 15', at least one event-driven state-machine 14, 15 per communication space 2, 6. The first event driven state-machine 14 which is related to the first communication space 2 (a mobile network 2') is pushed towards the operator unit 4 by the activated second event-driven state-machine 15. Consequently, a first application 4' running on the operator unit 4 incorporates at least partly the first event-driven state-machine 14 ComPg_Tel of the communication page 5' and got the responsibility to handle the actual desired (telephone) transaction for the served user. The operator unit 4 is connected via a mediator unit 3 to a mobile network 2' with an originating part 100 and a terminating part 101. The first event-driven state-machine 14 consists of an operator pre-defined part and another part which interprets (the user specific) commands of the first event-driven state-machine 14 (ComPg_Tel). Immediately after machine starts the actions envisaged for the operator pre-defined event TelEvent=PUSHComPg are executed. In this context there should be at least one action given by the user within the first event-driven state-machine 14 (ComPg_Tel) to be processed right now. Mainly this user action determines the instruction to be posted subsequently towards the CN 2' under control. As an option there could be a mediating application (mediator unit 3) in between of the operator's state-machine 4 and the core network 2' (CN). This mediator 3 is operator specific and acts as ordinary IN node or NGN application server from CN 2' point of view. The first web application 4' (first event-driven state-machine 14) has the responsibility to care about user transactions, independently on possible other, parallel transactions of the same user. The second event-driven state-machine 15 on the ISP 5 is in charge of combining user transactions (same or different user(s)).

Figure 3:
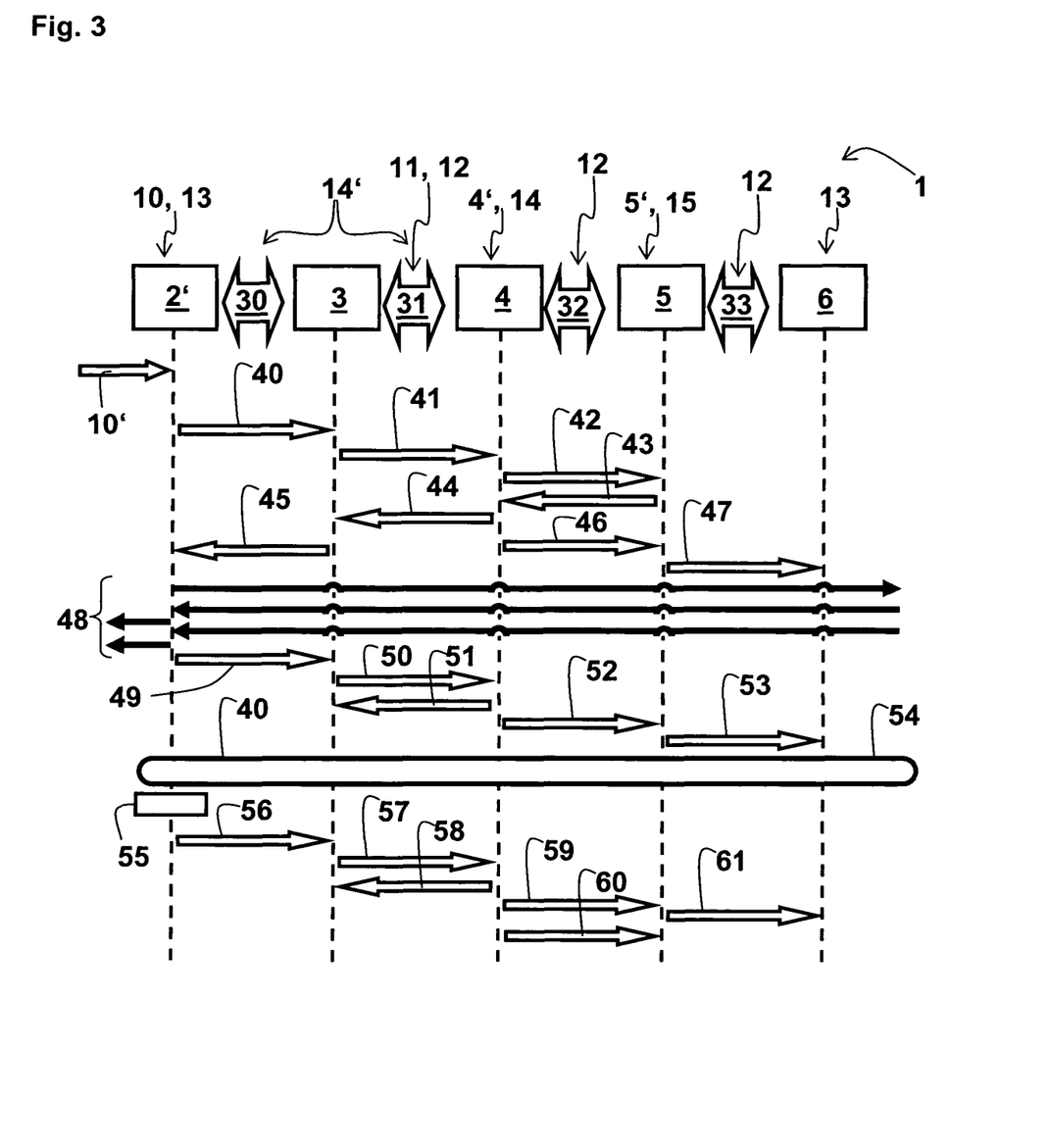
FIG. 3 illustrates a flowchart of a method for initiating a second service in dependency of a first service according to a third exemplary embodiment of the present invention.

FIG. 3 shows a flow chart of a method for transmission data according to a third exemplary embodiment the present invention, the third exemplary embodiment is similar to the first exemplary embodiment illustrated in FIG. 1 and shows a dedicated example of a communications page 5' and the corresponding call flows. The example describes a call flow between two users, Alice and Bob. The single steps of the call flow are illustrated in a chronological order relating to the vertical direction. The user Alice organized her communication page 5' on the internet server 5 in such a manner that she can reach Bob by dialing a private number (e.g. 200) instead of his official public telephone number (e.g. +49-171-6269xxx). Moreover, Alice and Bob aligned their services with respect to a private numbering scheme so that the caller's number (Alice, +49-160-1212xxx) is presented on Bob's terminal in accordance with the private numbering (e.g. 100) scheme. In addition, Alice added a simple screening function to her communication page 5' (experiential she acquired the habit to compare her telephone bill with the screening list once a month). So her service maintains a simple Internet text file "MYFILE" (located on her Web share) containing relevant data of all telephone calls (and call attempts) made.

The communication page 5' of Alice is available on the internet server 5 and comprises the first event-driven state-machine 14, the second event-driven state-machine 15 and a setup event-driven state-machine 16.

The setup event-driven state-machine 16 (also referred to as "DECLARATIONS") discloses the personal information about Alice, like her name, a file with a digital photo of her, her public telephone number her permissions concerning the mobile network provider. Furthermore, a private numbering scheme of the users Alice, Bob and Ed is defined, whereby the private number 100 and the nick name "CHERUBAlice" are allocated to the public telephone number "+49-160-1212xxx", the private number 200 and the nick name "BOB-TheBuck" are allocated to the public telephone number "+49-171-6269xxx" and finally the private number 999 and the nick name "Ed" are allocated to the public telephone number "+49-228-936-33xxx". The source code of the setup event-driven state-machine 16 is provided below (line numbers in brackets):

```
    <ComPg> (1)
  <DECLARATIONS> (2)
    <SERVEDUser>+49-160-1212xxx</SERVEDUser> (3)
    <CUSTOMERName>Fish, Alice</CUSTOMERName> (4)
    <WEB2.TPermission>basic</WEB2.TPermission> (5)
    <MYPICTURE> (6)
    http://www.ComPg.T-Mobile.org/ComPg/+49-160-1212xxx/me.jpg"
    (7)
    </MYPICTURE> (8)
    <MYFILE> (9)
    http://www.ComPg.T-Mobile.org/ComPg/+49-160-
    1212xxx/screening.txt" (10)
    </MYFILE> (11)
    <MYPRIVATEScheme> (12)
      <Contact name="CHERUBAlice"> (13)
        <PUBLIC>+49-160-1212xxx</PUBLIC> (14)
        <PRIVATE>100</PRIVATE> (15)
      </Contact> (16)
      <Contact name="BOBThebuck"> (17)
        <PUBLIC>+49-171-6269xxx</PUBLIC> (18)
        <PRIVATE>200</PRIVATE> (19)
      </Contact> (20)
      <Contact name="Ed"> (21)
        <PUBLIC>+49-228-936-33xxx</PUBLIC> (22)
        <PRIVATE>999</PRIVATE> (23)
      </Contact> (24)
    <MYPRIVATEScheme> (25)
  </DECLARATIONS> (26)
```

The second event-driven state-machine 15 is triggered by WEBEvents received from the outer World Wide Web 6 or from the operator unit 4. A first section <TELEPHONE> of the second event-driven state-machine 15 relates to telephony WEBEvent and pushes the first event-driven state-machine 14 to the operator unit 4 and changes the current number of transactions. A second section <ONHOOK> relates to another telephony WEBEvent which is received when the telephone connection is disconnected and which triggers again a change of the current transaction number. Each of the subsequent sections <U_SCREEN2>, <U_SCREEN456>, <U_SCREEN7> and <U_SCREEN9> concern to WEBEvents for writing the actual connection status of Alice's telephone extension into a web file "MYFILE" (to compare her telephone bill with the screening list once a month). The source code of the second event-driven state-machine 15 is provided below (line numbers in brackets):

```
        <ComPg_Web> (1)
<WEBEvents> (2)
    <TELEPHONE> (3)
        <ACTIONList> (4)
            <ACTION>query CURRENTTransactions of
            SERVEDUser</ACTION> (5)
            <ACTION> (6)
            assign a new TRANSACTIONNumber and update (7)
            CURRENTTransactions (8)
            </ACTION> (9)
            <ACTION> (10)
            send PUSHComPg incl. CURRENTTransactions (11)
            </ACTION> (12)
        </ACTIONList> (13)
    </TELEPHONE> (14)
    <ONHOOK> (15)
        <ACTIONList> (16)
            <ACTION>update CURRENTTransactions</ACTION> (17)
        </ACTIONList> (18)
    </ONHOOK> (19)
    <U SCREEN2> (20)
        <ACTIONList> (21)
            <ACTION>send SCREEN2 towards MYFILE</ACTION> (22)
        </ACTIONList> (23)
    </U SCREEN2> (24)
    <U SCREEN456> (25)
        <ACTIONList> (26)
            <ACTION>send SCREEN456 towards
            MYFILE</ACTION> (27)
        </ACTIONList> (28)
    </U SCREEN456> (29)
    <U SCREEN7> (30)
        <ACTIONList> (31)
            <ACTION>send SCREEN7 towards MYFILE</ACTION> (32)
        </ACTIONList> (33)
    </U SCREEN7> (34)
    <U SCREEN9> (35)
        <ACTIONList> (36)
            <ACTION>send SCREEN9 towards MYFILE</ACTION> (37)
        </ACTIONList> (38)
    </U SCREEN9> (39)
</WEBEvents> (40)
</ComPg Web> (41)
```

The first event-driven state-machine 14 is pushed towards the operator unit 4 by the second event-driven state-machine 15. The first event-driven state-machine 14 is triggered by TELEvents received from the mobile network 2 and from the mediator unit 3 respectively. The first TELEvent is PUSHComPg for extending the first application 4' according to the first event-driven state-machine 14 and storing the current transaction numbers. Furthermore, the private numbering scheme of Alice is activated and the requested private or public numbers are sent to the mobile network 2. Furthermore, the first event-driven state-machine 14 comprises the sections INITIAL, REPORT, SUCCESS and RELEASED for Initiating the WEBEvents <TELEPHONE>, <U_SCREEN456>, <ONHOOK>, <U_SCREEN7>, <U_SCREEN2> and <U_SCREEN9> in the second event-driven state-machine 15, as described above. The source code of the first event-driven state-machine 14 is provided below (line numbers in brackets):

```
        <ComPg Tel> (1)
<TELEvents> (2)
    <PUSHComPg> (3)
        <ACTIONList> (4)
            <ACTION> (5)
            extend SEM according ComPg_Tel received and store (6)
            CURRENTTransactions (7)
            </ACTION> (8)
            <USERACTIONList> (9)
                CASE (CURRENTTransactions.LAST) (10)
                OF SOC: (11)
                    <ACTION> (12)
                    calculate DESTNumber by mapping a called PRIVATE to
                    (13)
                    PUBLIC number (14)
                    </ACTION> (15)
                    <ACTION> (16)
                    for calls to Bob set CLIPNumber to my PRIVATE one (17)
                    </ACTION> (18)
                    <ACTION> (19)
                    arm progress types FAILURE, SUCCESS and RELEASED
                    (20)
                    </ACTION> (21)
                    <ACTION>send CONTINUE (22)
                    </ACTION> (23)
                    <ACTION> (24)
                    send U SCREEN2 with DESTNumber, called PRIVATE
                    number (25) and CURTimestamp (26)
                    </ACTION> (27)
                OF ELSE: (28)
                    <ACTION> (29)
                    arm progress types FAILURE and RELEASED (30)
                    </ACTION> (31)
                    <ACTION>send CONTINUE</ACTION> (32)
                CASE END (33)
            </USERACTIONList> </ACTIONList> (34)
    </PUSHComPg> (35)
    <INITIAL> (36)
        <ACTIONList> (37)
            <ACTION> (38)
            send TELEPHONE with all parameters received (39)
            </ACTION> (40)
        </ACTIONList> (41)
    </INITIAL> (42)
    <REPORT> (43)
        <ACTIONList> (44)
            CASE (PROGRESSTYPE) (45)
            OF FAILURE: (46)
                <USERACTIONList> (47)
                    <ACTION>send CONTINUE</ACTION> (48)
                    <ACTION> (49)
                    send U SCREEN456 with CURTimestamp (50)
                    </ACTION> (51)
                </USERACTIONList> (52)
                <ACTION>send ONHOOK</ACTION> (53)
            OF SUCCESS: (54)
                <USERACTIONList> (55)
                    <ACTION>send CONTINUE</ACTION> (56)
                    <ACTION> (57)
                    send U SCREEN7 with CURTimestamp (58)
                    </ACTION> (59)
                </USERACTIONList> (60)
            OF RELEASED: (61)
                <USERACTIONList> (62)
                    <ACTION>send CONTINUE</ACTION> (63)
                    <ACTION> (64)
                    send U SCREEN9 with CURTimestamp (65)
                    </ACTION> </USERACTIONList> (66)
                <ACTION>send ONHOOK</ACTION> (67)
            OF ELSE: (68)
                <ACTION>send CONTINUE</ACTION> (69)
            CASE END (70)
        </ACTIONList> (71)
    </REPORT> (72)
</TELEvents> (73)
</ComPg Tel> (74)
</ComPg> (75)
```

In a first step 40 Alice dials the private number 200 of Bob. This request (containing the private number) is transmitted from the core network 2' (first communication space 2) to the mediator unit 3. In a second step 41 the mediator unit 3 transforms the request into a command applicable for the operator unit 4 which features the calling party address of the serving user (Alice). The operator unit 4 addresses the request to the corresponding communication page 5' of the served user in a third step 42 as the first web event 11. It is however required that the served user is registered and trusted by the mobile network provider. Furthermore, the communication page 5' of the user has already to be uploaded to the internet server 5. The first web application 5' comprises the above mentioned communication page 5' (ComPg), wherein the user-ID (lines 3, 4 SEM 16 (event-driven state-machine 16)) of the served user and the requested numbering scheme (lines 12 to 25 of SEM 16) are defined in the setup event-driven state-machine 16. The first event 11 is processed in the second event-driven state-machine 15 of the communication page 5' and the corresponding actions (cp. lines 3 to 14 of SEM 15) for this <TELEPHONE> event are processed by the second web application 5'. Thus, in a fourth step 43 the first event-driven state-machine 14 of the communication page 5' is pushed to the operator unit 4 (cp. line 11 of SEM 15). Furthermore, the current transaction number is updated (line 7 of SEM 15) to check whether a maximum number of permitted parallel transactions is already achieved. Subsequently, the "PUSHComPg"-section of the first event-driven state-machine 14 is pushed to the operator unit 4 and integrated into the first web application 4'. The official telephone number of Bob which corresponds to the private number 200 is derived from the setup event-driven state-machine 16 and sent together with the private number of Alice (command "CONTINUE") via the mediator unit 3 to the core network in fifth and sixth steps 44, 45 (lines 12 to 27 of SEM 14). The core network 2' develops the maintained transaction call using the public telephone number of Bob +49-717-6269xxx, wherein Alice's private number 100 is presented at Bob's display. In a subsequent seventh step 46 a timestamp, as well as the private and the public called telephone numbers are transmitted as the second event 12 to the second event-driven state-machine 15 as a WEBEvent called SCREEN2 (line 25 of SEM 14). Because of this WEBEvent the section <SCREEN2> of the second event-driven state-machine 15 is activated and the timestamp is sent as the second service 13 to a certain Web file "MYFILE" in the World Wide Web 6 (line 22 of SEM 15) in an eighth step 47. The World Wide Web 6 has to been seen as the second communication space 6. Subsequently, the core network 2' routes the telephone extensions of Alice and Bob in a further step 48 to enable a telephone link 54. In ninth and tenth steps 49, 50 the core network 2' informs the operator unit 4 via the mediator unit 3 that the telephone link 54 between Alice and Bob has been established successfully. As instructed in the first event-driven state-machine 14 of the communication page 5' (lines 56 and 58 of SEM 14) the operator unit 4 sends a "CONTINUE"-command to the mediator unit 3 in a eleventh step 51 and a "U_SCREEN9"-command to the internet server 5 in a twelfth step 52. The second event-driven state-machine 15 detects the "U-SCREEN7"-command (cp. line 30 of SEM 15) and sends a SCREEN7-string towards the Web file called "MYFILE" in the Web 6 in the course of a thirteenth step 53 (cp. line 32 of SEM 15). Now, a conversation via the telephone link 54 between Alice and Bob in a common way is provided (enabling the telephone link 54 could also be seen as the second service 13 which continues the first service 10 (call request) in the first communication space 2, wherein the CONTINUE-command could be seen as the second event 12). After hanging up the phone 55, the core network 2' informs the operator unit 4 via the mediator unit 3 in fourteenth and fifteenth steps 56, 57 that the telephone link 54 is terminated. As defined in the first event-driven state-machine 14 (cp. lines 61 to 67 of SEM 14) the operator unit 4 transmits again a "CONTINUE"-command to the mediator unit 3 (sixteenth step 58) and a "U_SCREEN9"-command with a timestamp to the internet server 5 (seventeenth step 59). Furthermore, the second event-driven state-machine 15 is informed that the telephone link 54 is disconnected by way of an "ONHOOK"-sign (eighteenth step 60, line 67 of SEM 14)). According to line 37 of the second event-driven state-machine 15, the SCREEN9-sign with the timestamp is transmitted towards the Web file "MYFILE" in an nineteenth step 61 to document the exact time of terminating the telephone link 54 between Alice and Bob. Furthermore, the current transaction list is updated (increased with one), as the present transaction is terminated (cp. line 15 of SEM 15).

Figure 4:
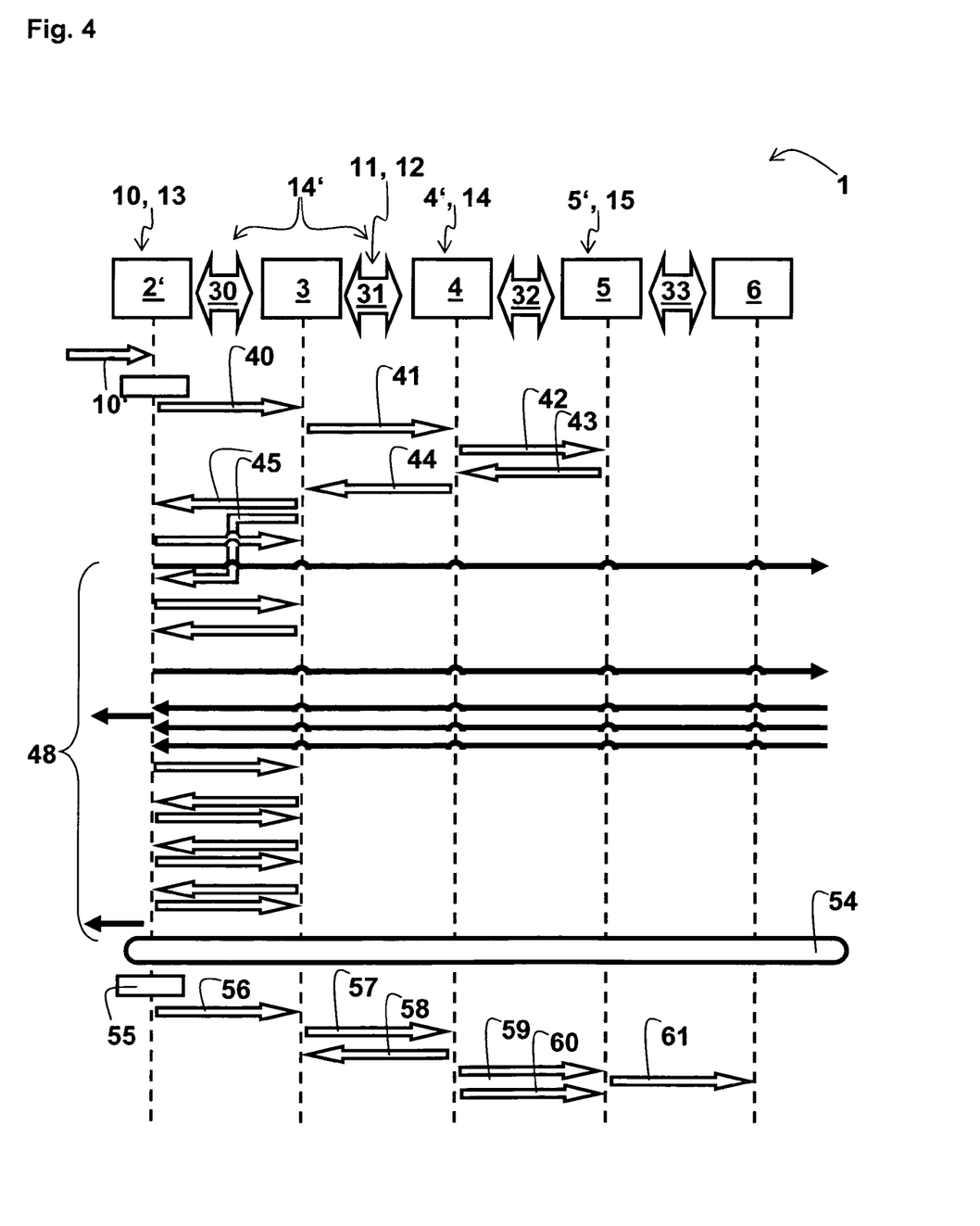
FIG. 4 illustrates a flowchart of a method for initiating a second service in dependency of a first service according to a fourth exemplary embodiment of the present invention.

FIG. 4 shows a flow chart of a method for initiating a second service 13 in dependency of a first service 10 according to a fourth exemplary embodiment of the present invention. The fourth exemplary embodiment is similar to the third exemplary embodiment illustrated in FIG. 3. Again Alice is calling Bob. But now Bob is the served user of interest who has two different phones each with its own telephone number. FIG. 4 shows the call flow relating to Bob's communication page 5' which is configured in such a manner, that in the case Bob is called, both of his phones are being alerted in parallel.

The source code and the functionality of the setup event-driven state-machine 16 of Bob are substantially similar to the setup event-driven state-machine 16 of Alice, as mentioned above. The source code of the setup event-driven state-machine 16 of Bob is listed below:

```
<DECLARATIONS> (1)
<SERVEDUser>+49-171-6269xxx</SERVEDUser> (2)
<CUSTOMERName>Fish, Bob</CUSTOMERName> (3)
<WEB2.TPermission>extensionl</WEB2.TPermission> (4)
<MYPICTURE> (5)
http://www.ComPg.T-Mobile.org/ComPg/+49-171-6269xxx/me.jpg"
(6)
</MYPICTURE> (7)
<EDCOUNTERPLACE> (8)
   http://www.EdwardArts.de/MoneyMachine" (9)
</EDCOUNTERPLACE> (10)
MYPRIVATEScheme> (11)
   <Contact name="THEFlatfish"> (12)
      <PUBLIC>+49-160-1212xxx</PUBLIC> (13)
      <PRIVATE>100</PRIVATE> (14)
   </Contact> (15)
   <Contact name="BOBYbrown"> (16)
      <PUBLIC>+49-171-6269xxx</PUBLIC> (17)
      <PRIVATE>200</PRIVATE> (18)
```

```
        </Contact> (19)
        <Contact name="Ed"> (20)
            <PUBLIC>+49-228-936-33xxx</PUBLIC> (21)
            <PRIVATE>999</PRIVATE> (22)
        </Contact> (23)
    </MYPRIVATEScheme> (24)
</DECLARATIONS> (25)
```

Also, the second event-driven state-machine 15 of Bob is similar to the second event-driven state-machine 15 of Alice, as mentioned above. Merely, the sections <U_SCREEN2>, <U_SCREEN456>, <U_SCREEN7> and <U_SCREEN9> are not realized in Bob's second event-driven state-machine 15. The source code of the second event-driven state-machine 15 of Bob is listed below:

```
<ComPg Web> (1)
<WEBEvents> (2)
    <TELEPHONE> (3)
        <ACTIONList> (4)
            <ACTION>query CURRENTTransactions of SERVEDUser (5)
            </ACTION> (6)
            <ACTION> (7)
            assign a new TRANSACTIONumber (8)
            and update CURRENTTransactions (9)
            </ACTION> (10)
            <ACTION> (11)
                send PUSHComPg incl. CURRENTTransactions (12)
            </ACTION> (13)
        </ACTIONList> (14)
    </TELEPHONE> (15)
    <ONHOOK> (16)
        <ACTIONList> (17)
            <ACTION>update CURRENTTransactions</ACTION> (18)
        </ACTIONList> (20)
    </ONHOOK> (21)
    <U COUNTER> (22)
        <ACTIONList> (23)
            <ACTION>send BOBCOUNTER towards
                EDCOUNTERPLACE (24)
            </ACTION> (25)
        </ACTIONList> (26)
    </U COUNTER> (27)
</WEBEvents> (28)
</ComPg Web> (29)
```

Also, the first event-driven state-machine 14 of Bob is similar to the first event-driven state-machine 14 of Alice, wherein Bob's first event-driven state-machine 14 comprises a further section "STC" in his <USERACTIONList> (lines 23 to 20 of SEM 14). The section STC defines both a DEST-Number (as known from Alice's SEM 14) for calling his first phone and an additional DESTNumber2 for his second phone (cp lines 24, 25 of SEM 14). The source code of the first event-driven state-machine 14 of Bob is listed below:

```
<ComPg Tel> (1)
<TELEvents> (2)
    <PUSHComPg> (3)
        <ACTIONList> (4)
            <ACTION> (5)
            extend SEM according ComPg_Tel received and store (6)
            CURRENTTransactions (7)
            </ACTION> (8)
            <USERACTIONList> (9)
            CASE (CURRENTTransaction.LAST) (10)
                OF SOC: (11)
                    <ACTION> (12)
                    calculate DESTNumber by mapping a (13)
                    called PRIVATE to PUBLIC number (14)
                    </ACTION> (15)
                    <ACTION> (16)
                    for calls to Alice set CLIPNumber to my PRIVATE one (17)
                    </ACTION> (18)
                    <ACTION> (19)
                    arm progress types FAILURE and RELEASED (20)
                    </ACTION> (21)
                    <ACTION>send CONTINUE</ACTION> (22)
                OF STC: (23)
                    <ACTION>set DESTNumber to my PUBLIC one</ACTION> (24)
                    <ACTION>set DESTNumber2 to +49-171-2146xxx</ACTION>
                    (25)
                    <ACTION> (26)
                    arm progress types FAILURE and RELEASED (27)
                    </ACTION> (28)
                    <ACTION>send CONTINUE</ACTION> (29)
                    <ACTION>set ACTIVELegs=2</ACTION> (30)
                OF ELSE: (31)
                    <ACTION> (32)
                    arm progress types FAILURE and RELEASED (33)
                    </ACTION> (34)
                    <ACTION>send CONTINUE</ACTION> (35)
            CASE END (36)
            </USERACTIONList> (37)
        </ACTIONList> (38)
    </PUSHComPg> (39)
    <INITIAL> (40)
        <ACTIONList> (42)
            <ACTION> (43)
            send TELEPHONE with all parameters received (44)
            </ACTION> (45)
        </ACTIONList> (46)
    </INITIAL> (47)
    <REPORT> (48)
        <ACTIONList> (49)
            CASE (PROGRESSTYPE) (50)
                OF FAILURE: (51)
                    IF (ACTIVELegs=2) (52)
                    THEN (53)
                        <ACTION>send CONTINUE</ACTION> (54)
                        <ACTION>ACTIVELegs=1</ACTION> (55)
                    ELSE (56)
                        <ACTION>send CONTINUE</ACTION> (57)
                        <ACTION>send ONHOOK</ACTION> (58)
                    FI (59)
                OF RELEASED: (60)
                    <USERACTIONList> (61)
                        <ACTION>send CONTINUE</ACTION> (62)
                        <ACTION>send UCOUNTER</ACTION> (63)
                    </USERACTIONList> (64)
                    <ACTION>send ONHOOK</ACTION> (65)
                OF ELSE: (66)
                    <ACTION>send CONTINUE</ACTION> (67)
            CASE END (68)
        </ACTIONList> (69)
    </REPORT> (70)
</TELEvents> (71)
</ComPg Tel> (72)
</ComPg (73)
```

The call flow illustrated in FIG. 4 is similar to the call flow according to the third exemplary embodiment of the present invention which is described in FIG. 3. The communication between the operator unit 4 and the internet server 5, as well as between the internet server 5 and the Web 6 are similar. However, the fifth step 44 comprises not only one destination number, but two destination numbers for each of Bob's phones ("DESTNumber" and "DESTNumber2"). This leads to more traffic between the mediator unit 3 and the core network 2' as the core network 2' has to request two telephone links 54 between Alice and Bob in parallel, instead of a single telephone link 54 as described above.

Figure 5:
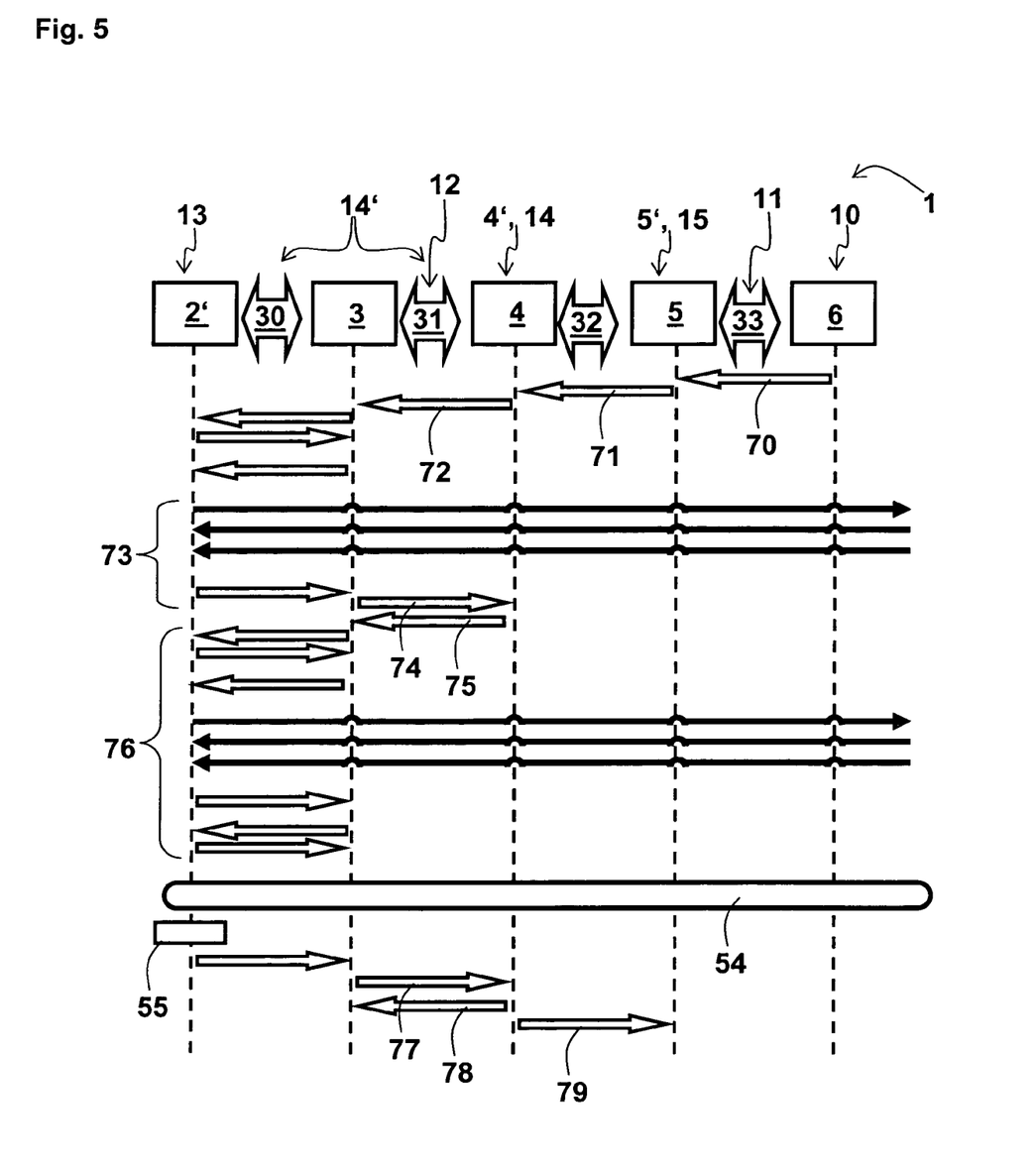
FIG. 5 illustrates a flowchart of a method for initiating a second service in dependency of a first service according to a fifth exemplary embodiment of the present invention.

FIG. 5 shows a flow chart of a method for initiating a second service 13 in dependency of a first service 10 according to a fifth exemplary embodiment of the present invention, wherein the fifth exemplary embodiment is similar to the third exemplary embodiment illustrated in FIG. 3. In the fifth exemplary embodiment a call from Ed to Doris (public telephone number +49-222-32978xxx) is shown, whereby the costs for this call are allocated to Bob's account. In order to achieve this, the first and the second event-driven state-machines 14, 15 of Bob are modified relative to the fourth exemplary embodiment. Only the source code of the setup event-driven state-machine 16 of Bob is similar to the setup event-driven state-machine 16 of Bob, as disclosed above. The source code of the setup event-driven state-machine 16 of Bob is listed below:

```
<DECLARATIONS> (1)
<SERVEDUser>+49-171-6269xxx</SERVEDUser> (2)
<CUSTOMERName>Fish, Bob</CUSTOMERName> (3)
<WEB2.TPermission>extensionl</WEB2.TPermission> (4)
<MYPICTURE> (5)
http://www.ComPg.T-Mobile.org/ComPg/+49-171-6269xxx/me.jpg"
(6)
</MYPICTURE> (7)
<EDCOUNTERPLACE> (8)
   http://www.EdwardArts.de/MoneyMachine" (9)
</EDCOUNTERPLACE> (10)
MYPRIVATEScheme> (11)
   <Contact name="THEFlatfish"> (12)
      <PUBLIC>+49-160-1212xxx</PUBLIC> (13)
      <PRIVATE>100</PRIVATE> (14)
   </Contact> (15)
   <Contact name="BOBYbrown"> (16)
      <PUBLIC>+49-171-6269xxx</PUBLIC> (17)
      <PRIVATE>200</PRIVATE> (18)
   </Contact> (19)
   <Contact name="Ed"> (20)
      <PUBLIC>+49-228-936-33xxx</PUBLIC> (21)
      <PRIVATE>999</PRIVATE> (22)
   </Contact> (23)
</MYPRIVATEScheme> (24)
</DECLARATIONS> (25)
```

In contrast to the second event-driven state-machine 15 of Bob, described in the fourth exemplary embodiment of the present invention, the second event-driven state-machine 15 of Bob, as listed below, comprises an additional section called <5SINGLES+> (cp. lines 27 to 40 of SEM 15). Thus, the second event-driven state-machine 15 can be triggered by a Web event <5SINGLES+> from the World Wide Web 6 (cp. line 27 of SEM 15) to push the first event-driven state-machine 14 to the operator unit 4 (cp. line 37 of SEM 15). This first web event 11 is initialized by a further communication page 5' of Ed, for instance (preferably triggered by a first service 10 in the World Wide Web 6). The source code of the modified second event-driven state-machine 15 of Bob is listed below:

```
<ComPg_Web> (1)
  <WEBEvents> (2)
    <TELEPHONE> (3)
      <ACTIONList> (4)
         <ACTION>query CURRENTTransactions of
            SERVEDUser</ACTION> (5)
```

-continued

```
         <ACTION> (6)
            assign a new TRANSACTIONumber and (7)
            update CURRENTTransactions (8)
         </ACTION> (9)
         <ACTION> (10)
            send PUSHComPg incl. CURRENTTransactions (11)
         </ACTION> (12)
      </ACTIONList> (13)
    </TELEPHONE> (14)
    <ONHOOK> (15)
      <ACTIONList> (16)
         <ACTION>update CURRENTTransactions</ACTION> (17)
      </ACTIONList> (18)
    </ONHOOK> (19)
    <U COUNTER> (20)
      <ACTIONList> (21)
         <ACTION> (22)
            send BOBCOUNTER towards EDCOUNTERPLACE (23)
         </ACTION> (24)
      </ACTIONList> (25)
    </U COUNTER> (26)
    <5SINGLES+> (27)
      <ACTIONList> (28)
         <ACTION> (29)
            query CURRENTTransactions of SERVEDUser (30)
         </ACTION> (31)
         <ACTION> (32)
            assign a new TRANSACTIONNumber and update (33)
            CURRENTTransactions (34)
         </ACTION> (35)
         <ACTION> (36)
            send PUSHComPg icl. CURRENTTransactions (37)
         </ACTION> (38)
      </ACTIONLIST> (39)
    </5SINGLES+> (40)
  </WEBEvents> (41)
```

The first event-driven state-machine 14 of Bob, as mentioned below, comprises three additional sections compared to the first event-driven state-machine 14 as described in connection with the fourth exemplary embodiment of the present invention. The first additional section features the case "WIC" in the <USERACTIONList> of the section <PUSHComPg> (cp. lines 31 to 40 of SEM 14). The case "WIC" includes the command "set PARTYToCall to +49-228-936-33xxx" (public number of Ed) in order to use Ed's telephone extension as the calling party in Bob's account (cp. line 34 of SEM 14). Subsequently, the new variable "DORISIsCalled" is set "true" (cp. line 40 of SEM 14). Furthermore the present first event-driven state-machine 14 comprises the IF-cases: U_DORISIsCalled=true in the reporting sections <SUCCESS> and <RELEASED> (cp. lines 66 to 80 and lines 83 to 89 of SEM 14). The variable DORISIsCalled=true causes the setup of the destination number to +49-222-32979xxx (Doris public telephone number) (cp. line 71 of SEM 14) and a telephone link 54 between Ed and Doris is connected with the usage of Bob's account (the telephone link is enabled in the above mentioned way). The source code of the first event-driven state-machine 14 of Bob is listed below:

```
<ComPg_Tel> (1)
<TELEvents> (2)
  <PUSHComPg> (3)
    <ACTIONList> (4)
      <ACTION> (5)
         extend SEM according ComPg_Tel received and store (6)
         CURRENTTransactions (7)
      </ACTION> (8)
    <USERACTIONList> (9)
      CASE (CURRENTTransaction.LAST) (10)
```

```
OF SOC: (11)
    <ACTION> (12)
    calculate DESTNumber by mapping a called PRIVATE to
    PUBLIC (13)
    number (14)
    </ACTION> (15)
    <ACTION> (16)
    for calls to Alice set CLIPNumber to my PRIVATE one (17)
    </ACTION> (18)
    <ACTION> (19)
    arm progress types FAILURE and RELEASED (20)
    </ACTION> (21)
    <ACTION>send CONTINUE</ACTION> (22)
OF STC: (23)
    <ACTION>set DESTNumber to my PUBLIC one</ACTION> (24)
    <ACTION>set DESTNumber2 to +49-171-2146xxx</ACTION>
    (25)
    <ACTION> (26)
    arm progress types FAILURE and RELEASED (27)
    </ACTION> (28)
    <ACTION>send CONTINUE</ACTION> (29)
    <ACTION>set ACTIVELegs=2</ACTION> (30)
OF WIC: (31)
    <ACTION>set SERVEDUser to my PUBLIC one</ACTION> (32)
    <ACTION> (33)
    set PARTYToCall to +49-228-936-33xxx (34)
    </ACTION> (35)
    <ACTION> (36)
    arm progress types FAILURE, SUCCESS and RELEASE (37)
    </ACTION> (38)
    <ACTION>send INITIATE</ACTION> (39)
    <ACTION>set U_DORISIsCalled=true</ACTION> (40)
OF ELSE: (41)
    <ACTION> (42)
    arm progress types FAILURE and RELEASED (43)
    </ACTION> (44)
    <ACTION>send CONTINUE</ACTION> (45)
    CASE END (46)
</USERACTIONList> (47)
</ACTIONList> (48)
</PUSHComPg> (49)
<INITIAL> (50)
    <ACTIONList> (51)
        <ACTION> (52)
        send TELEPHONE with all parameters received (53)
        </ACTION> (54)
    </ACTIONList> (55)
        CASE (PROGRESSTYPE) (56)
        OF FAILURE: (57)
            IF (ACTIVELegs=2) (58)
            THEN (59)
                <ACTION>send CONTINUE</ACTION> (60)
                <ACTION>ACTIVELegs=1</ACTION> (61)
            ELSE (62)
                <ACTION>send CONTINUE</ACTION> (63)
                <ACTION>send ONHOOK</ACTION> (64)
            FI (65)
        OF SUCCESS: (66)
            <USERACTIONList> (67)
            IF (U_DORISIsCALLED=true) (68)
            THEN (69)
                <ACTION> (70)
                set DESTNumber to +49-222-32978xxx (71)
                </ACTION> (72)
                    ACTION> (73)
                    arm progress types FAILURE and RELEASED (74)
                    </ACTION> (75)
                    <ACTION>send CONTINUE</ACTION> (76)
                ELSE (77)
                    <ACTION>send CONTINUE</ACTION> (78)
                FI (79)
            </USERACTIONList> (80)
        OF RELEASED: (81)
            <USERACTIONList> (82)
            IF (U_DORISIsCALLED=true) (83)
            THEN (84)
                <ACTION>send CONTINUE</ACTION> (85)
            ELSE (86)
                <ACTION>send CONTINUE</ACTION> (87)
                <ACTION>send U_COUTNER</ACTION> (88)
            FI (89)
            </USERACTIONList> (90)
            <ACTION>send ONHOOK</ACTION> (91)
        OF ELSE: (92)
            <ACTION>send CONTINUE</ACTION> (93)
        CASE END (94)
    </ACTIONList> (95)
    </REPORT> (96)
</TELEvents> (97)
</ComPg Tel> (98)
</ComPg> (99)
```

The call flow illustrated in FIG. 5 is similar to the call flow according to the third exemplary embodiment of the present invention which is described in FIG. 3. In contrast, the initial event in the present flow chart comes from the World Wide Web 6. Ed initiates Bob's communication page 5' on the internet server 5 in a first step 70 by using the command <5SINGLES+>. This command causes the second event-driven state-machine 15 of Bob to push the first event-driven state-machine 14 to the operator unit 4 in a second step 71 (cp. line 37 of SEM 14). Subsequently, the section <PUSHComPg> of the first event-driven state-machine 14 (now included into the first application 4') is executed on the operator unit 4 in a third step 72, wherein the user Bob is applied (as the served user) with his public number +49-717-6269xxx to the core network 2' (cp. line 32 of SEM 14) and Ed's telephone number +49-228-936-33xx is defined as the calling party in the core network 2' (cp. line 34 of SEM 14). Afterwards the core network 2' calls Ed's telephone extension as the calling party address in fourth steps 73. In a fifth step 74 the core networks 2' informs the first event-driven state-machine 14 that the routing of Ed's telephone extension has been successful by using the command REPORT(SUCCESS). Consequently, the first event-driven state-machine 14 is triggered (cp. lines 66 of SEM 14) and the destination number is set to Doris public number +49-222-32978xxx (cp. line 71 of SEM 14) which is sent to the core network 2' in a sixth step 75 (cp. line 76 of SEM 14). The core network 2' calls Doris public number and enables a telephone link 54 between Ed and Doris in seventh steps 76. After the telephone link 54 is terminated 55 (by hanging up the phone, for instance) the core network 2' sends the command REPORT(RELEASED) to the operator unit 4 in a eighth step 77. This command triggers again the first event-driven state-machine 14 (cp. line 81 of SEM 14) and subsequently the event-driven state-machine 14 answers with the event "CONTINUE" in a ninth step 78 (cp. 85 of SEM 14). Furthermore, the first event-driven state-machine 14 sends the "ONHOOK"-signal to the second event-driven state-machine 15 on the internet server 6 in a tenth step 79 (cp. line 91 of SEM 14).

The invention claimed is:

1. A method for initiating a second service in dependency of a first service using individually configured event-driven state-machines, the method comprising:
    executing the first service in a first communication space;
    transmitting a first event to an operator unit in dependency of the first service;
    triggering a first event-driven state-machine of the operator unit by the first event;
    generating a second event by the first event-driven state-machine;
    transmitting the second event to at least one of the first communication space and a second communication space; and initiating the second service in the at least one of the first communication space and the second communication space by the second event;

wherein the first event-driven state-machine is pushed from an internet server to the operator unit by a second event-driven state-machine;

wherein the first event-driven state-machine is individually configurable by a user for initiating the second event in dependency of the first event;

wherein:

an initial first service triggers an initial web event which is transmitted to the second event-driven state-machine by a first application of the operator unit, wherein the initial web event triggers the second event-driven state-machine in such a manner that the first event-driven state-machine is pushed to the operator unit; and the first event-driven state-machine is initially pushed from the internet server towards the operator unit by the second event-driven state-machine in such a manner that the first application includes at least partially the functionality of the first event-driven state-machine.

2. The method according to claim 1, wherein the second event-driven state-machine is individually configurable by the user for pushing the first event-driven state-machine to the operator unit.

3. The method according to claim 1, wherein the first event-driven state-machine is initially pushed from the Internet server towards the operator unit by the second event-driven state-machine in such a manner that the first application includes the source-code of the first event-driven state-machine.

4. The method according to claim 1, wherein a first communication between the first communication space and the operator unit is controlled by the first event-driven state-machine which is pushed towards the operator unit, and wherein a second communication between the internet server and the internet is controlled by the second event-driven state-machine on the internet server.

5. The method according to claim 1, wherein the first communication space is linked to the operator unit via a mediator unit, and wherein the mediator unit transforms a data type of the first communication space into a data type applicable for the first event-driven state-machine and transforms a data type of the first event-driven state-machine into a data type applicable for the first communication space.

6. The method according to claim 1, wherein the second communication space is linked to the internet server via a further operator unit comprising a further first event-driven state-machine.

7. The method according to claim 6, wherein the further event-driven state-machine is pushed to the further operator unit by the second event-driven state-machine.

8. The method according to claim 1, wherein the internet server comprises a setup event-driven state-machine representing at least one of an individually configured setup of the user and personal information about the user.

9. The method according to claim 1, wherein at least one of the first, the second, the further first and the setup event-driven state-machines are provided by a web page on the internet server featuring a well-defined Uniform Resource Identifier, wherein a web page is allocated to at least one of a first user and a first group of users and wherein the at least one of the first user and the first group of users is allocated a well-defined ID in the corresponding communication space.

10. The method according to claim 1, wherein at least one of the first, the second, the further first and the setup event-driven state-machines are configured by at least one of uploading an algorithm to the internet server, online modification of the algorithm on the internet server and clearing the algorithm by a provider.

11. The method according to claim 10, wherein the at least one of the first, the second, the further first and the setup event-driven state-machine is configured by the user with the aid of a graphical user interface, wherein the graphical user interface comprises at least one of templates and a compiler which transforms graphical inputs from the user into an applicable computer language for a corresponding event-driven state machine.

12. The method according to claim 1, wherein at least one of the first and the second communication space comprise at least one of a telephone network, a mobile communications network, the internet, an intranet, a next generation network, a wireless local area network, domains, subdomains, electrical systems of communication devices, electronic systems of communication devices, global positioning devices, building services, portable personal devices, alarms systems, phones, mobile phones, presentation tools, and electrical consumer products.

13. The method according to claim 1, wherein the method is used as a user-configurable communication interface between at least two different first and second communication spaces.

14. A tangible, non-transitory computer-readable medium, part of an internet server, comprising:

a first event-driven state-machine;

a second event-driven state-machine; and computer-executable instructions for initiating a second service in dependency of a first service using the event-driven state-machines, the computer-executable instructions comprising:

instructions for pushing, by the second event-driven state-machine, the first event-driven state-machine at least partially from the internet server to an operator unit, when the second event-driven state-machine detects an initial event from a first communication space, wherein the first event-driven state-machine controls a first communication between the operator unit and the first communication space;

wherein:

an initial first service triggers an initial web event which is transmitted to the second event-driven state-machine by a first application of the operator unit, wherein the initial web event triggers the second event-driven state-machine in such a manner that the first event-driven state-machine is pushed to the operator unit; and the first event-driven state-machine is initially pushed from the internet server towards the operator unit by the second event-driven state-machine in such a manner that the first application includes at least partially the functionality of the first event-driven state-machine.

15. An operator unit, comprising a processor and a tangible, non-transitory processor-readable medium having processor-executable instructions stored thereon for initiating a second service in dependency of a first service using individually configured event-driven state-machines, wherein the processor, based on execution of the processor-executable instructions, is configured for:

executing the first service in a first communication space;
transmitting a first event to an operator unit in dependency of the first service;
triggering a first event-driven state-machine of the operator unit by the first event;
generating a second event by the first event-driven state-machine;
transmitting the second event to at least one of the first communication space and a second communication space; and
initiating the second service in the at least one of the first communication space and the second communication space by the second event;
wherein the first event-driven state-machine is pushed from an internet server to the operator unit by a second event-driven state-machine;
wherein the first event-driven state-machine is individually configurable by a user for initiating the second event in dependency of the first event;
wherein:
  an initial first service triggers an initial web event which is transmitted to the second event-driven state-machine by a first application of the operator unit, wherein the initial web event triggers the second event-driven state-machine in such a manner that the first event-driven state-machine is pushed to the operator unit; and
  the first event-driven state-machine is initially pushed from the internet server towards the operator unit by the second event-driven state-machine in such a manner that the first application includes at least partially the functionality of the first event-driven state-machine.

16. The operator unit according to claim 15, wherein the operator unit is further configured to allow the first event-driven state-machine to be pushed from the internet server to the operator unit by a second event-driven state-machine;
  wherein the operator unit further comprises the first application, which is configured to include at least partially a functionality of the first event-driven state-machine;
  wherein at least the first event-driven state-machine is individually configurable by a user for initiating the second event in dependency of the first event in such a manner that the first application of the operator unit includes at least partially the functionality of the first event-driven state-machine.

17. The operator unit according to claim 16, wherein the first application is further configured to include at least partially a source code of the first event-driven state machine.

* * * * *